United States Patent [19]
Ernst

[11] Patent Number: 4,951,399
[45] Date of Patent: Aug. 28, 1990

[54] POSITION MEASURING DEVICE

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 394,263

[22] Filed: May 5, 1989

Related U.S. Application Data

[63] Continuation of Ser. No. 70,691, Jul. 7, 1987, abandoned.

[30] Foreign Application Priority Data

Jul. 19, 1986 [DE] Fed. Rep. of Germany ....... 3624485

[51] Int. Cl.[5] .............................................. G01B 5/02
[52] U.S. Cl. ........................................ 33/706; 33/707; 356/374
[58] Field of Search ................................ 33/706–708, 33/710, 711, 705; 356/373, 374, 375, 395; 250/237 G, 239

[56] References Cited

U.S. PATENT DOCUMENTS

| | | | |
|---|---|---|---|
| 4,273,447 | 6/1981 | Nelle | 356/373 |
| 4,295,742 | 10/1981 | Nelle et al. | 33/125 C |
| 4,414,746 | 11/1983 | Takizawa | 33/125 C |
| 4,492,032 | 1/1985 | Nelle | 33/125 C |
| 4,517,742 | 5/1985 | Ernst | 33/125 C |
| 4,541,181 | 9/1985 | Giacomello | 33/125 C |
| 4,564,294 | 1/1986 | Ernst | 33/125 C |
| 4,603,480 | 8/1986 | Sakagami | 33/125 A |

FOREIGN PATENT DOCUMENTS 2810341 5/1979 Fed. Rep. of Germany .
3201887 8/1983 Fed. Rep. of Germany .

Primary Examiner—William A. Cuchlinski, Jr.
Assistant Examiner—Patrick R. Scanlon
Attorney, Agent, or Firm—Willian Brinks Olds Hofer Gilson & Lione

[57] ABSTRACT

A position measuring device for measuring the relative position of two objects (01, 02) comprising a graduation (Ta) in a graduation plane (TFa) of the graduation carrier (TTa) which is connected to one of the objects (01). The object (01) is scanned by a scanning unit (A) which is connected to the other object (02) by means of a carrier (MT). Between the carrier (MT) and the scanning unit (A), a coupling link (K), preferably in the form of a leaf spring, is aligned in the direction of measurement X. This spring has only one rotational degree of freedom in a direction perpendicular to the graduation surface (TFa) of the graduation carrier (TTa). A guide mechanism (F) comprises a guide element (FE) which guides the scanning unit (A) in a direction parallel to the direction of measurement X on a guide surface (FFa) of the graduation carrier (TTa). The guide surface (FFa) is perpendicular to the graduation surface (TFa) of the graduation carrier (TTa). The guide mechanism (F) further comprises a guide joint (FG) for connecting the scanning unit (A) with the guide element (FE). The guide joint (FG) possesses at least one translational degree of freedom perpendicular to the direction of measurement X.

12 Claims, 2 Drawing Sheets

POSITION MEASURING DEVICE

This application is a continuation of application Ser. No. 070,691 filed July 7, 1987 now abandoned.

BACKGROUND OF THE INVENTION

The present invention relates to a position measuring device for measuring the relative position of two objects.

Position measuring devices may be employed in machining equipment which measures the relative position of a tool in relation to a workpiece which is to be machined as well as in coordinate measuring machines which determine the position and/or dimensions of a test object.

Such position measuring devices general require a scanning unit which can be slid along an auxiliary guide which is independent from the guide of the object to be measured. The devices also require that the scanning unit be coupled to the object to be measured and/or to a carrier attached to it.

A longitudinal measuring device for measuring the relative position of two objects is known from DE-PS No. 28 10 341 in which the graduation of a graduation carrier is scanned by a scanning unit. The graduation carrier is connected to one object, while another object is connected by means of a carrier. The scanning unit is guided by rigidly mounted guide shoes and rollers on guide surfaces of the graduation carrier and guide surfaces of the housing for the graduation carrier. The scanning unit is forcibly engaged with these guide surfaces by springs which are supported on the housing and on the carrier. The scanning unit is further connected to the carrier via a coupling link having two rotational degrees of freedom around two axes of rotation which are orthogonal to each other and perpendicular to the direction of measurement. The coupling link is in the form of a spring wire mounted parallel to the direction of measurement. This coupling link, however, is only rigid at one end in the direction of measurement, and measurement errors will occur.

DE-PS No. 32 01 887 describes a longitudinal measuring device in which the graduation of a graduation carrier connected to the first object to be measured is scanned by a scanning unit which is connected to the second object to be measured by a carrier. The scanning unit is guided by rigidly mounted guide shoes and rollers on a guide surface of the graduation carrier and on a guide surface of the housing for the graduation carrier. The scanning unit is further connected to the carrier via a coupling, which has a first leaf spring joint having a first rotational degree of freedom around a first rotational axis perpendicular to the direction of measurement, and a second leaf spring joint having a second rotational degree of freedom around a rotational axis orthogonal to the first rotational axis and perpendicular to the direction of measurement, and a linear guide having two translational degrees of freedom perpendicular to the direction of measurement. Both of the leaf springs which run in the direction of measurement similarly are only rigid, at one end, resulting in measurement error. Furthermore, the linear guide is also subject to wear and tear.

It is therefore an object of the present invention to eliminate measurement errors in position measurement devices of the type mentioned above. Other objects of the present invention will become apparent from the following description.

SUMMARY OF THE INVENTION

In accordance with the present invention, there is provided a position measuring device for measuring the relative position of two objects. The device comprises a graduation in a graduation plane of a graduation carrier which is connected to one of the objects. The object is scanned by a scanning unit which is connected to the other object by way of a coupling means. The coupling means has only one rotational degree of freedom perpendicular to the graduation plane. A means for guiding the scanning unit in a direction parallel to the direction of measurement on a guide surface is also provided. The guide surface is perpendicular to the graduation plane and parallel to the direction of measurement. The guide means is joined with the scanning unit by a guide coupling having at least one translational degree of freedom perpendicular to the direction of measurement.

BRIEF DESCRIPTION OF THE DRAWINGS

Presently preferred exemplary embodiments of the present invention summarized above are illustrated in the accompanying drawings as follows.

DESCRIPTION OF PREFERRED EMBODIMENTS

In accordance with the present invention, it has now been discovered that by using a coupling between the scanning unit and the object, measurement errors in position measuring devices can be substantially reduced or even eliminated. According to one embodiment of the present invention, a coupling link with only one degree of freedom around a rotational axis perpendicular to the graduation surface of the graduation carrier allows the overall length of the coupling to be kept so small that due to its increased rigidity in the direction of measurement, measurement errors within the tolerances of the required accuracy can be prevented. The coupling is preferably in the form of a leaf spring in the direction of measurement. Further, an auxiliary guide means comprising a guide coupling having a translational degree of freedom parallel to the graduation surface of the graduation carrier and perpendicular to the direction of measurement to connect the guide elements with the scanning unit may also be employed. In such an arrangement, any misalignment in parallelism between the guide means cf the objects to be measured and the auxiliary guide means may be offset. Longitudinal flexibility of the guide coupling of the present invention, preferably in the form of a leaf spring parallelogram, cannot cause any measurement errors, since the coupling is not located between the object to be measured and the scanning unit, but rather lies outside of the measurement circle of the position measuring device.

Other advantages of the present invention will become apparent from the following description which when taken in conjunction with the accompanying drawings, discloses presently preferred exemplary embodiments of the present invention.

Figure 1:
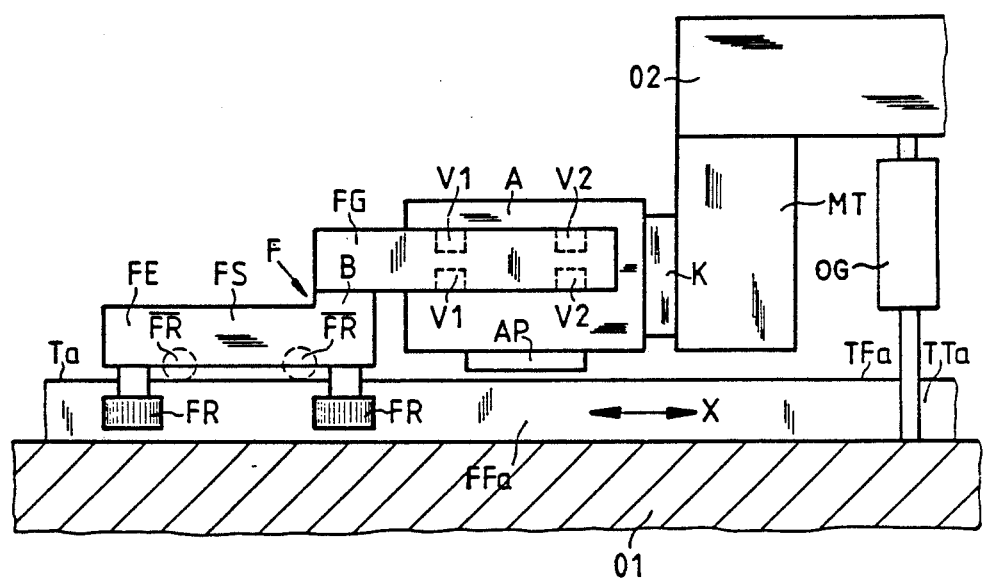
FIG. 1 schematically depicts a side view of an incremental longitudinal measurement device.
Figure 2:
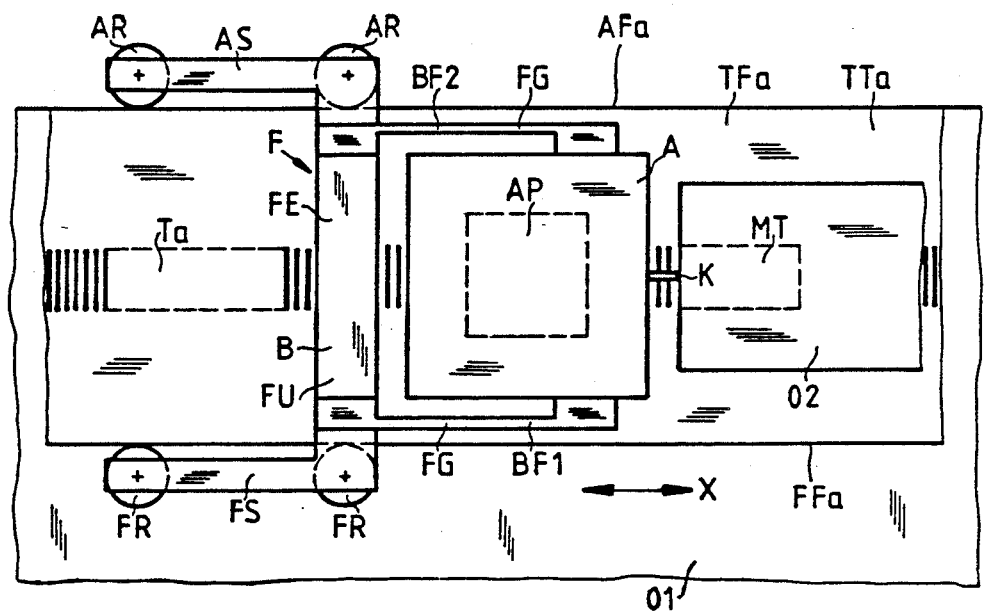
FIG. 2 is a top view of the device of FIG. 1.

In accordance with one embodiment of the present invention, an incremental longitudinal measuring device is schematically shown in FIG. 1 in a side view and in FIG. 2 in a cross sectional view. A graduation carrier TTa with a rectangular cross section is attached to an object 01 and comprises a graduation surface TFa with an incremental graduation Ta which is scanned by a scanning unit A that is connected to another object 02. Both objects 01 and 02, whose relative positions to one another are to be measured, are shown herein as a bed and cradle of a machining device. Scanning unit A is connected to the object 02 via a carrier MT. A coupling link K is located between the carrier MT and the scanning unit A. The coupling link K contains only one rotational degree of freedom around a rotational axis perpendicular to the graduation surface TFa of the graduation carrier TTa. Coupling link K, preferably in the form of a leaf spring, possesses a high degree of rigidity in the direction of measurement X due to its short overall length, and sufficient flexibility around the rotational axis perpendicular to the graduation surface TFa of the graduation carrier TTa.

Coupling link K, here in the form of a leaf spring, possesses an overall length perpendicular to the graduation surface TFa of the graduation carrier TTa sufficient to support the scanning unit A. Therefore, it is not necessary to additionally support and guide scanning unit A on the graduation surface TFa, by for example, rollers. In order to scan the graduation Ta of the graduation carrier TTa, the scanning unit A comprises, according to arrangements known to those skilled in the art, a scanning plate AP with a scanning graduation, a lighting unit and at least one photoelement.

A guide mechanism F comprising a guide element FE and a guide coupling FG guides the scanning unit A in a direction parallel to the direction of measurement X. Referring to FIG. 2, guide element FE comprises a U-shaped guide frame FU, having a guide leg FS which is arranged parallel to the direction of measurement X, two rigidly fixed guide rollers FR, intervally positioned in the direction of measurement X, which engage a guide surface FFa which is perpendicular to the graduation surface TFa of the graduation carrier TTa and parallel to the direction of measurement X. The guide frame FU further comprises a contact pressure leg AS which is parallel to the measurement direction X and comprises two spring loaded contact pressure rollers AR intervally positioned in the direction of measurement X to secure by pressure both guide rollers FR to the guide surface FFa of the graduation carrier TTa. Rollers AR secure guide rollers FR by engaging surface AFa of graduation carrier TTa. Surface AFa lies opposite and parallel to guide surface FFa of the graduation carrier TTa.

Guide element FE is mounted to scanning unit A via guide coupling FG which is shown in the form of a leaf spring parallelogram having a translational degree of freedom perpendicular to the direction of measurement X and parallel to the graduation surface TFa of the graduation carrier TTa. The leaf spring parallelogram comprises two leaf springs BF1, BF2, which are mounted to base B of guide element FE and to the side surface of the scanning unit A. Both leaf springs BF1, BF2 have an overall perpendicular height with respect to the graduation surface TFa of the graduation carrier TTa sufficient to support guide element FE on the graduation surface TFa of the graduation carrier TTa. Those skilled in the art will readily understand, however, that additional guide or support means may be employed. Such additional guide or support means for the guide element FE is shown, for example, by broken lines as guide rollers FR' on the graduation surface TFa of the graduation carrier TTa. When such guide rollers FR' are employed, leaf springs BF1, BF2 of guide coupling FG would each further comprise two diminished cross sections V1, V2 so that the guide coupling FG would have an additional translational degree of freedom perpendicular to the direction of measurement X and perpendicular to the graduation surface TFa of the graduation carrier TTa.

Figure 3:
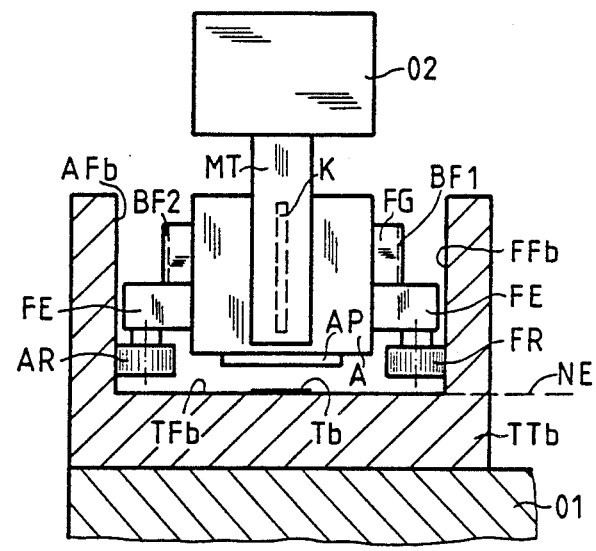
FIG. 3 depicts another incremental longitudinal measuring device from a cross sectional perspective.

FIG. 3 exemplifies another embodiment of the present invention wherein an incremental longitudinal measuring device is shown in a cross sectional view in which the graduation carrier TTb comprises a U-shaped profile. Graduation surface TFb comprising graduation Tb is located on the bottom of the graduation carrier TTb, preferably in its neutral plane NE. The other elements of FIG. 3 are identical to the corresponding elements of FIGS. 1 and 2 and are thus assigned the same identifying letters. The two side interior surfaces of the U-shaped graduation carrier TTb function as the guide surface FFb for the guide rollers FR and as the contact surface AFb for the pressure contact rollers AR of the guide element FE.

Figure 4:
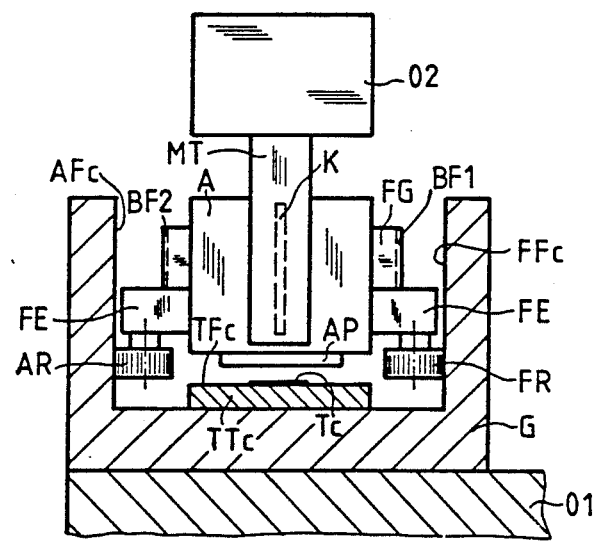
FIG. 4 illustrates a cross sectional view of an encased incremental longitudinal measuring device.

FIG. 4 illustrates a further embodiment of the present invention wherein an encased incremental longitudinal measuring device is shown in a cross sectional view in which a graduation carrier TTc is constructed and arranged with a rectangular cross section secured to the bottom of body G. Body G comprises a U-shaped housing of suitable dimension for the graduation carrier TTc and the scanning unit A. The graduation carrier TTc comprises a graduation Tc in a graduation plane TFc. The other elements of FIG. 4 are identical to the corresponding elements of FIGS. 1 and 2 and thus may also be assigned the same identifying letters. The two side interior surfaces of the U-shaped housing G serve as the guide surface FFc for the guide rollers FR and as the contact surface AFc for the contact pressure rollers AR of the guide element FE.

Because of its increased rigidity, the coupling link K prevents measurement errors in the measurement direction X within the tolerances of the required accuracy and, due to its rotational degree of freedom around a rotational axis perpendicular to the graduation surface TF of the graduation carrier TT, offsets any angular deviations between the guide means OG of the objects 01, 02 which are to be measured and the auxiliary guide means, guide surface FF of the graduation carrier TT. The guide coupling FG of the guide mechanism F, due to its translational degree of freedom perpendicular to the direction of measurement X and parallel to the graduation surface TF of the graduation carrier TT allows a misalignment in the parallelism between the guide of the objects to be measured (01, 02) and the auxiliary guide surface FF of the graduation carrier TT to be offset.

The invention may be successfully employed in incremental as well as absolute position measuring devices. Those skilled in the art will further understand that the present invention may be employed in photoelectric, magnetic, capacitive and inductive measuring devices and the like.

Similarly, the invention may be also successfully employed in interferrometric position measuring devices in which a greater scanning distance between the graduation surface of the graduation carrier and the scanning plate of the scanning unit is made possible with an increase in scanning tolerance. Such an interferometric position measuring device is described in DE-PS No. 24 31 551.

It is to be understood that a wide range of changes and modifications to the embodiments described above will be apparent to those skilled in the art, and are also contemplated. It is therefore intended that the foregoing detailed description be regarded as illustrative rather than limiting, and that it be understood that it is the following claims including all equivalents which are intended to define the spirit and scope of this invention.

I claim:

1. In a position measuring device for measuring the relative position of two objects during a measurement interval, comprising a graduation in a graduation plane of a graduation carrier which is connected to one object, a scanning unit which is coupled to another object via a coupling link arranged in the direction of measurement, object guide means for guiding said one object relative to said other object, and auxiliary guide means for guiding said scanning unit relative to the graduation carrier independent of the guidance of said object guide means, the improvement comprising said coupling link (K) having only one rotational degree of freedom perpendicular to the graduation plane (TF) of the graduation carrier (TT) and being located between the scanning unit (A) and said other object (02), and said auxiliary guide means (F) including a guide element (FE) which guides said scanning unit (A) parallel to the direction of measurement (X) on a guide surface (FF) perpendicular to the graduation plane (TF) of the graduation carrier and a guide link (FG) for joining said guide element (FE) with said scanning unit (A), said guide link (FG) comprising at least one translational degree of freedom perpendicular to the direction of measurement (X) during said measurement interval.

2. The measuring device of claim 1 wherein said coupling link (K) comprises a leaf spring.

3. The measuring device of claim 1 wherein said guide element (FE) includes a U-shaped guide frame (FU) with a base (B) comprising a guide leg (FS) having at least one guide roller (FR), and a contact pressure leg (AS) arranged parallel to the guide leg (FS) and having at least one spring loaded contact pressure roller (AR).

4. The measuring device of claim 1 wherein said guide link (FG) comprises a leaf spring parallelogram having two leaf springs (BF1, BF2), which are fastened to the base (B) of the guide element (FE) of said guide means and respectively to opposite side surfaces of said scanning unit (A).

5. The measuring device of claim 3 wherein said guide element (FE) comprises additional guide rollers (FR') for guiding said guide element (FE) on the graduation surface (TFa) of the graduation carrier (TTa).

6. The measuring device of claim 4 wherein said leaf springs (BF1, BF2) comprise a least one diminished cross section (V1, V2).

7. The measuring device of claim 1 wherein said graduation carrier (TTb) is U-shaped and comprises a graduation surface (TFb) lying in a neutral plane (NE) of said graduation carrier (TTb).

8. The measuring device of claim 1 further comprising a body (G) connected to said graduation carrier (TTc) and constituting a housing for said graduation carrier (TTc) and said scanning unit (A).

9. The measuring device of claim 1 wherein said device is an interferometric position measuring device.

10. The measuring device of claim 1 wherein said guide surface (FF) is located on the graduation carrier (TT).

11. The measuring device of claim 1 wherein said guide surface (FF) is located on a body (G) which carries said graduations (T).

12. A position measuring device for measuring the relative position of two objects during a measurement interval, the device comprising: (a) a graduation in a graduation plane, said graduation plane being connected with the first object; (b) a scanning unit coupled with the second object by way of a coupling means having only one rotational degree of freedom perpendicular to the graduation plane; and (c) a means for guiding said scanning unit in a direction parallel to the direction of measurement on a guide surface, said guide surface being perpendicular to said graduation plane and parallel to said direction of measurement, said guide means being joined with said scanning unit by guide link means for providing at least one translational degree of freedom perpendicular to the direction of measurement during said measurement interval.

* * * * *

UNITED STATES PATENT AND TRADEMARK OFFICE
CERTIFICATE OF CORRECTION

PATENT NO. : 4,951,399

DATED : August 28, 1990

INVENTOR(S) : Alfons Ernst

It is certified that error appears in the above-identified patent and that said Letters Patent is hereby corrected as shown below:

On the cover page, line 3 of the Abstract, please delete "the" and substitute therefor --a--.

In column 1, line 17, please delete "general" and substitute therefor --generally--.

In column 2, line 56, please delete "cf" and substitute therefor --of--.

In claim 3, line 2, before "element" please insert --means further comprises a guide--; and delete "includes" and substitute therefor --having--.

In claim 4, line 2, please delete "link" and substitute therefor --coupling--;

UNITED STATES PATENT AND TRADEMARK OFFICE
CERTIFICATE OF CORRECTION

PATENT NO. : 4,951,399
DATED : August 28, 1990
INVENTOR(S) : Alfons Ernst

It is certified that error appears in the above-identified patent and that said Letters Patent is hereby corrected as shown below:

In claim 4, line 5, please delete "respectively to opposite" and substitute therefor --to the--; and delete "surfaces" and substitute therefor --surface--.

In claim 6, line 2, before "least" please delete "a" and substitute therefor --at--.

Signed and Sealed this

Thirteenth Day of October, 1992

Attest:

DOUGLAS B. COMER

*Attesting Officer*     *Acting Commissioner of Patents and Trademarks*